UNITED STATES PATENT OFFICE 2,560,240

PROCESS FOR PREPARING SULFONAMIDES

Rupert Oppenauer, Buenos Aires, Argentina

No Drawing. Application April 12, 1949,
Serial No. 87,130

2 Claims. (Cl. 260—556)

My present invention relates to the manufacture of sulfonamides and more particularly refers to a new process for producing sulfonamides in an industrially economical and efficient manner.

It is known to prepare sulfonamides, particularly of the aliphatic group, by transforming sulfochlorides with liquid ammonia, according to the formula $$R-SO_2Cl + 2NH_3 \rightarrow R-SO_2NH_2 + NH_4Cl$$

wherein R is an aliphatic radical, e. g. $C_{15}H_{31}$ or $C_3H_7$, a mixed aromatic-aliphatic radical, e. g. $C_6H_5-C_3H_6$, a cycloaliphatic radical, etc.

This known method, however, is disadvantageous for several reasons. On the one hand, the high pressure of liquid ammonia at room temperature requires the execution of said method in high pressure autoclaves. On the other hand, if it is desired to avoid the use of such autoclaves, the amidation reaction has to be carried through at relatively low temperature. In this latter case the reaction takes place at normal pressure, but with the disadvantages that the reaction velocity is relatively low and that difficult cooling problems are encountered.

Now, the main object of my present invention is to provide a new process by means of which the aforementioned disadvantages are completely eliminated.

In accordance with the invention, it has been found that ammonia compounds of addition to ammonium salts, e. g.

$$NH_4NO_3.2NH_3; NH_4CNS.2NH_3; NH_4CNS.3NH_3$$

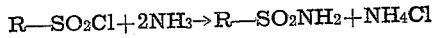

etc., at room temperature i. e. of about 17° C., although they act like liquid ammonia (see Gmelin Kraut, volume "Nitrogen," about Divers' solutions), however, do not develop the high pressure and, therefore, are not to be cooled down to a relatively low temperature.

In further accordance with the invention, it has been found that the addition compounds referred to do not take part in the amidation reaction of sulfochlorides into sulfonamides, but that the same may be said to simply act as vehicles for the ammonia and as $NH_3$-vapor-pressure-reducing agents.

Thus, in accordance with the invention, it has also been found that the addition compounds referred to act like catalysts which advantageously may be used as often as desired.

In accordance with the preceding statements, an important object of the invention is to provide a new process for the preparation of sulfonamides, which comprises the transformation of sulfochlorides with liquid ammonia in the form of liquid $NH_3$-compounds of addition to ammonium salts.

Another object of the invention is to provide a new process as referred to, which comprises the transformation of sulfochlorides with liquid $NH_4NO_3.(NH_3)_x$-addition compounds as amidation reagents.

Still another object of the invention is to provide a new process as referred to, which comprises the transformation of sulfochlorides with liquid $NH_4CNS.(NH_3)_x$-addition compounds as amidation reagents.

A further object of the invention is to provide a new process as referred to, which comprises the transformation of sulfochlorides with mixtures of liquid $NH_3$-compounds of addition to ammonium salts.

Another important object of the invention is to provide a new process as referred to, which comprises causing the amidation reaction of sulfochlorides to take place at normal pressure and at room temperature in the range of about 15–20° C.

Another not less important object of the invention is to provide a new process as referred to, which includes the step of regenerating the amidation reagent so as to use the same as often as desired.

Still another important object of the invention is to provide a new process as referred to, which is carried out in a continuous manner.

In accordance with the present invention and as already stated, for the purpose of preparing sulfonamides, instead of employing liquid ammonia alone, $NH_3$-compounds of addition to ammonia salts of stronger acids, for instance, ammonium nitrate and ammonium thiocyanate, are used as amidation reagents, wherein the proper addition compounds act as vehicles for the active ammonia and as vapor pressure-reducing agents therefor, so that the amidation reaction may be carried through at normal pressure in a usual stirring apparatus and with tap water cooling.

It is advantageous to supply an excess (approximately 4 to 5 times the molar quantity) of the ammonia required for the reaction in the form of the complex or addition compounds referred to, in order to obtain, after introduction of the sulfochlorides, good yields of the respective sulfonamides, which after interrupting the stirring operation form a layer on the ammoniacal reaction liquor; this layer may be easily removed and is then washed with water.

The ammonium chloride formed by the reaction is dissolved only to a very small extent in the ammoniacal reaction liquor, the major part thereof precipitating in form of easily filtrable crystals, which upon completion of the reaction by pressure filtration may be removed from said liquor. This liquor, consisting of a mixture of e. g. $NH_4NO_3.2NH_3$ with $NH_4NO_3.NH_3$ and with a small quantity of $NH_4Cl$, under slight cooling, may be re-saturated with fresh ammonia so as to obtain e. g. the $NH_4NO_3.(NH_3)_x$-addition compounds suitable for being used in a new amidation reaction.

Instead of the afore-mentioned addition compounds, other compounds e. g. $NH_4CNS.(NH_3)_x$, etc., as well as mixtures thereof may be used.

By means of a correct selection of the sulfochlorides, according to this invention, it is also possible to prepare higher sulfonamides, such as disulfonamides and trisulfonamides.

Finally, due to the above described advantageous features and working conditions and to the possibility of re-saturating the ammoniacal reaction liquor with fresh ammonia, the process according to the invention may be readily carried out in a continuous manner.

*Example 1*

800 grams=10 mol of ammonium nitrate, by external cooling with tap water, are cooled down to about 15° C. Into the crystalline mass ammonia gas is introduced under vigorous stirring and, as the addition reaction is slightly exothermic, care is taken for maintaining the temperature below 21° C. The introduction of ammonia gas into the ammoniacal liquor in formation is continued under vigorous stirring and external cooling with the tap water, until all of the ammonium nitrate present be liquefied. Into the so formed clear liquid $NH_4NO_3.2NH_3$-addition compound, while stirring and cooling are continued, there are introduced little by little 310 grams of hexadecansulfochloride and thereafter stirring is continued for one hour. After the stirring operation being interrupted, the so formed hexadecansulfonamide separates as a compact layer on the ammoniacal reaction liquor. After removing said layer and washing it with water, the yield is of about 280 grams of hexadecansulfonamide.

*Example 2*

In 1100 grams of liquid $NH_4NO_3.2NH_3$-addition compound as prepared in accordance with Example 1, there are introduced 400 grams=1 mol of disulfodichloride (which has been prepared in the presence of Hg-light by the simultaneous action of sulfur dioxide and chlorine on a "Kogasin"-fraction or a Diesel oil fraction in the boiling range of from 280° to 320° C.). During the introduction of the disulfodichloride the mass is vigorously stirred and externally cooled with tap water and care is taken for maintaining the temperature below 21° C. After introducing the whole quantity of the disulfodichloride stirring and cooling are continued for one hour. Thereafter the mass is left standing and the so formed disulfodiamide separates in form of a relatively tough viscous oil on the ammoniacal reaction liquor. After removing said oil and washing it with water, about 340 grams of disulfodiamide are obtained.

If the ammoniacal reaction liquor, after the removal of the disulfodiamide, is left standing for several hours, ammonium chloride crystals, formed in the amidation reaction, precipitates from said liquor and are removed by pressure filtration, whereafter under cooling the reaction liquor is re-saturated with fresh ammonia so as to form the liquid $NH_4NO_3.2NH_3$-addition compound ready for being used in a new amidation reaction.

*Example 3*

760 grams=10 mol of ammonium thiocyanate ($NH_4CNS$) are treated with ammonia gas in a stirring apparatus under continuous external cooling and stirring until the liquefaction of the crystalline mass be completed. Not before all the crystals of the ammonium thiocyanate have been liquefied, is the liquor ready for the amidation reaction. Now, while stirring and cooling are continued, 310 grams=1 mol of Diesel-oil-monosulfochloride or "Kogasin"-monosulfochloride (prepared in the presence of Hg-light by simultaneous action of sulfur dioxide and chlorine on "Kogasin II") are gradually introduced into the $NH_4CNS.2NH_3$ or $NH_4CNS.3NH_3$-addition compound. After interrupting the stirring operation, about 280 grams of "Kogasin"-monosulfonamide separate in form of an oily layer on the ammoniacal reaction liquor.

After removing the amide layer, the reaction liquor may be regenerated by introducing fresh ammonia. If in the course of further amidations precipitation of ammonium chloride occurs, the precipitated crystals thereof are advantageously removed by pressure filtration or by centrifugation.

The ammonium thiocyanate does not participate in the amidation reaction and remains unchanged; in the same manner as the ammonium nitrate, it merely acts as a vehicle for the ammonia and as a $NH_3$-vapor-pressure-reducing agent. Consequently the $NH_4CNS.(NH_3)_x$-addition compounds may be regenerated as often as desired.

It has to be understood that the present invention is by no means restricted to the aforegoing examples, but that alterations and modifications may be made therein by persons skilled in the art, and that such alterations and modifications are to be considered as falling within the scope of the invention as clearly outlined and set forth in the appended claims.

What I claim as new and desire to secure by Letters Patent is:

1. Process for the preparation of sulfonamides by amidation of sulfochlorides, which comprises treating the sulfochlorides at normal pressure and in a temperature range of from 15° to 20° C. with liquid ammonia present in the form of a liquid $NH_3$-compound of addition to a vapor-pressure-reducing agent selected from the group consisting of ammonium nitrate, ammonium thiocyanate, and a mixture thereof.

2. Process for the preparation of sulfonamides by amidation of sulfochlorides, which comprises treating the sulfochlorides under stirring and external cooling, with liquid ammonia present in the form of a liquid $NH_3$-compound of addition to a vapor-pressure-reducing agent selected from the group consisting of ammonium nitrate, ammonium thiocyanate, and a mixture thereof.

RUPERT OPPENAUER.

REFERENCES CITED

The following references are of record in the file of this patent:

UNITED STATES PATENTS

| Number | Name | Date |
|---|---|---|
| 2,174,492 | Reed | Sept. 26, 1939 |
| 2,225,960 | Arthner | Dec. 24, 1940 |
| 2,287,639 | Pings | June 23, 1943 |
| 2,334,186 | Fox | Nov. 16, 1943 |
| 2,394,902 | Engelmann | Feb. 12, 1946 |

FOREIGN PATENTS

| Number | Country | Date |
|---|---|---|
| 848,001 | France | July 17, 1939 |